United States Patent [19]

West

[11] Patent Number: 5,005,873
[45] Date of Patent: Apr. 9, 1991

[54] MARKING OF ARTICLES

[76] Inventor: Michael A. West, 59 Dale Wood Rd., Orpington Kent, United Kingdom, BR6 0BY

[21] Appl. No.: 133,034
[22] PCT Filed: Apr. 7, 1987
[86] PCT No.: PCT/GB87/00239
    § 371 Date: Jan. 22, 1988
    § 102(e) Date: Jan. 22, 1988
[87] PCT Pub. No.: WO87/06197
    PCT Pub. Date: Oct. 22, 1987

[30] Foreign Application Priority Data

Apr. 7, 1986 [GB] United Kingdom ............... 8608427

[51] Int. Cl.⁵ .................... G06K 19/06; B42D 15/00; B42F 21/00
[52] U.S. Cl. ........................... 283/92; 283/85; 235/491
[58] Field of Search ........... 283/85, 92, 94, 75, 283/904, 74, 89; 428/916, 913; 40/2.2, 2 R; 430/10; 235/491

[56] References Cited

U.S. PATENT DOCUMENTS

| 3,279,826 | 10/1966 | Rudershausen et al. ........ 235/491 |
| 3,666,946 | 5/1972 | Trimble ............................ 235/491 |
| 4,202,491 | 5/1980 | Suzuki . |
| 4,219,599 | 8/1980 | Idelson ............................ 283/92 |
| 4,442,170 | 4/1984 | Kaule .............................. 283/92 |
| 4,451,521 | 5/1984 | Kaule .............................. 283/92 |
| 4,451,530 | 5/1984 | Kaule .............................. 283/92 |
| 4,469,725 | 9/1984 | Fischer et al. . |
| 4,500,116 | 2/1985 | Ferro et al. ...................... 283/92 |
| 4,544,183 | 10/1985 | Parkinson . |
| 4,715,623 | 2/1987 | Roule .............................. 283/85 |

FOREIGN PATENT DOCUMENTS

| 1599011 | 12/1979 | Fed. Rep. of Germany ........ 283/92 |
| 17683 | 1/1984 | Japan ................................ 235/491 |
| 363881 | 2/1931 | United Kingdom . |
| 1170965 | 1/1967 | United Kingdom . |
| 1123274 | 8/1968 | United Kingdom . |
| 1143362 | 2/1969 | United Kingdom . |
| 1228388 | 4/1971 | United Kingdom . |
| 1231215 | 5/1971 | United Kingdom . |
| 1316528 | 5/1973 | United Kingdom . |
| 1399007 | 7/1975 | United Kingdom . |
| 1439173 | 6/1976 | United Kingdom . |
| 1482760 | 8/1977 | United Kingdom . |
| 2076337 | 12/1981 | United Kingdom . |
| WO03507 | 12/1981 | World Int. Prop. O. ........... 283/92 |
| WO03508 | 12/1981 | World Int. Prop. O. ........... 283/92 |

Primary Examiner—Douglas D. Watts
Assistant Examiner—Paul M. Heyrana, Sr.
Attorney, Agent, or Firm—Bernard, Rothwell & Brown

[57] ABSTRACT

An article comprising a substrate having markings which are provided by at least two fluorescent materials which have different excitation spectra in the ultraviolet region of the spectrum and different emission spectra in the visible region of the spectrum. The invention also provides a method of marking an article for identification.

30 Claims, 3 Drawing Sheets

MARKING OF ARTICLES

The present invention relates to the marking of articles and in particular to the marking of articles with a characteristic identifying feature which can give a visual indication of the authenticity of the article.

British Patent Specification No. 1123274 discloses an identification document having embedded therein superposed layers of a fluorescent material and an ultraviolet screening agent. The layer of ultraviolet screening agent has a code formed therein so that when the document is illuminated with ultraviolet radiation, the code can be seen. The code is invisible in light containing only small amounts of ultraviolet radiation (e.g. daylight). However such a document, and identification documents generally, are not sufficiently secure against tampering by a skilled forger who wishes to alter the information on the document and also against forging to produce counterfeit documents. In particular, a skilled forger could delaminate the identity document and alter the information thereon before re-laminating the document. Also, a forger could reproduce the superposed layers and incorporate them into a counterfeit document.

There is a growing need for a method of making articles which cannot easily be tampered with even by a skilled forger, or reproduced by an unauthorised person. There is also a growing need for a method of making articles in a way in which any tampering or forging action can be revealed in a simple way by a non-expert person. The present invention aims to fulfill both of those needs.

Accordingly, the present invention provides an article comprising a substrate having markings which are provided by at least two fluorescent materials which have different excitation spectra in the ultraviolet region of the spectrum and different emission spectra in the visible or infra red region of the spectrum.

Preferably, the at least two fluorescent materials are excited to fluoresce at different wavelengths of ultraviolet radiation and when excited fluoresce with different colours in the visible region of the spectrum.

Optionally, each fluorescent material is in a respective fluorescent layer and the fluorescent layers are superposed over each other.

Desirably, each fluorescent layer comprises a plastics material in which the respective fluorescent material is incorporated uniformly and the fluorescent layers are heat bonded together.

Preferably, the heat bonded surface of one of the fluorescent layers has engraved grooves therein into which extends that fluorescent layer which is heat bonded thereto.

In one preferred arrangement, the substrate comprises a base layer and the surface of the base layer which is covered by the superposed fluorescent layers is provided with visual identification data which can be seen through the superposed fluorescent layers.

In another preferred arrangement, there are at least two of the fluorescent layers and between two adjacent fluorescent layers is provided visual identification data.

More preferably, the visual identification data is provided by a pattern of a UV absorbing but visibly transparent material.

Advantageously, the base layer is a layer of plastics material and the base layer and the superposed fluorescent layers are heat bonded together.

One of the fluorescent layers may comprise the substrate, and more preferably the surface of the substrate fluorescent layer which is covered by the or each other fluorescent layer is provided with visual identification data which can be seen through the other fluorescent layer or layers.

Still more preferably, the visual identification data is provided by a pattern of a UV absorbing but visibly transparent material.

In an alternative embodiment of the present invention, the at least two fluorescent materials are in admixture and are contained in a body of material.

Preferably, the body comprises a plastics material and constitutes the substrate.

In a further alternative embodiment of the present invention one of the fluorescent materials is contained in a layer of plastics material, an exposed surface of the layer of plastics material is engraved with grooves representing visual identification data, and a second one of the fluorescent materials fills the grooves.

In any one of the foregoing embodiments, at least one of the fluorescent materials may be phosphorescent.

The present invention further provides a method of marking an article for identification, the method comprising providing the article with at least two fluorescent materials which has different excitation spectra in the ultraviolet region of the spectrum and different emission spectra in the visible or infra red region of the spectrum.

It is to be understood that in this specification the term "marking" is to be interpreted in its broadest sense so as to include the provision of a visually detectable feature, characteristic colour or pattern on an article.

Embodiments of the present invention will now be described by way of example only with reference to the accompanying drawings in which.

Figure 4:
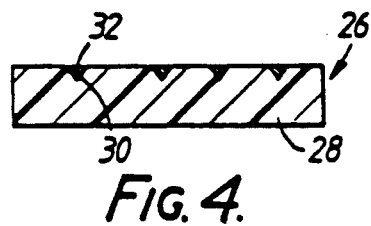
FIG. 4 shows a cross-section through an article which is marked in accordance with a fourth embodiment of the present invention.
Figure 6:
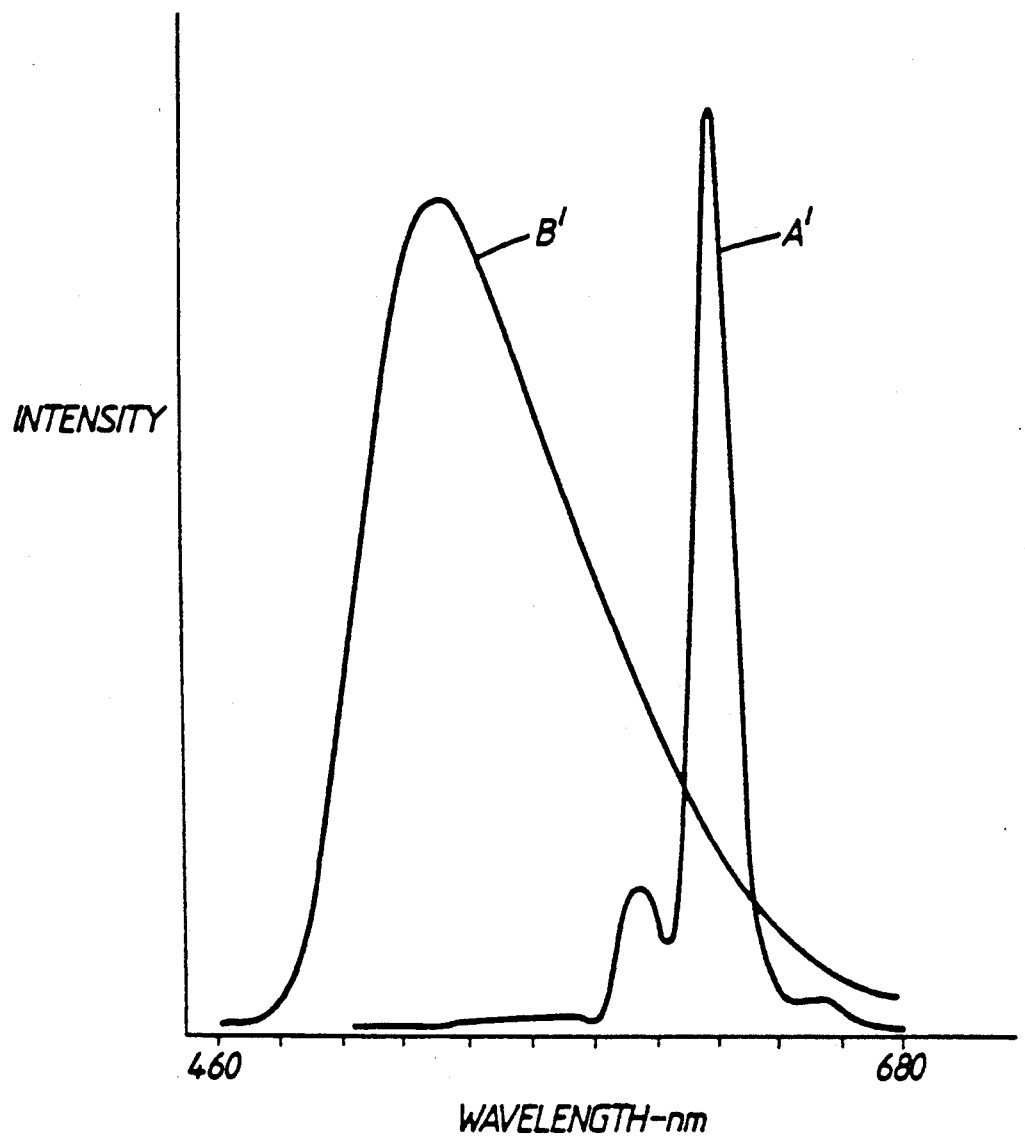
Figure 7:
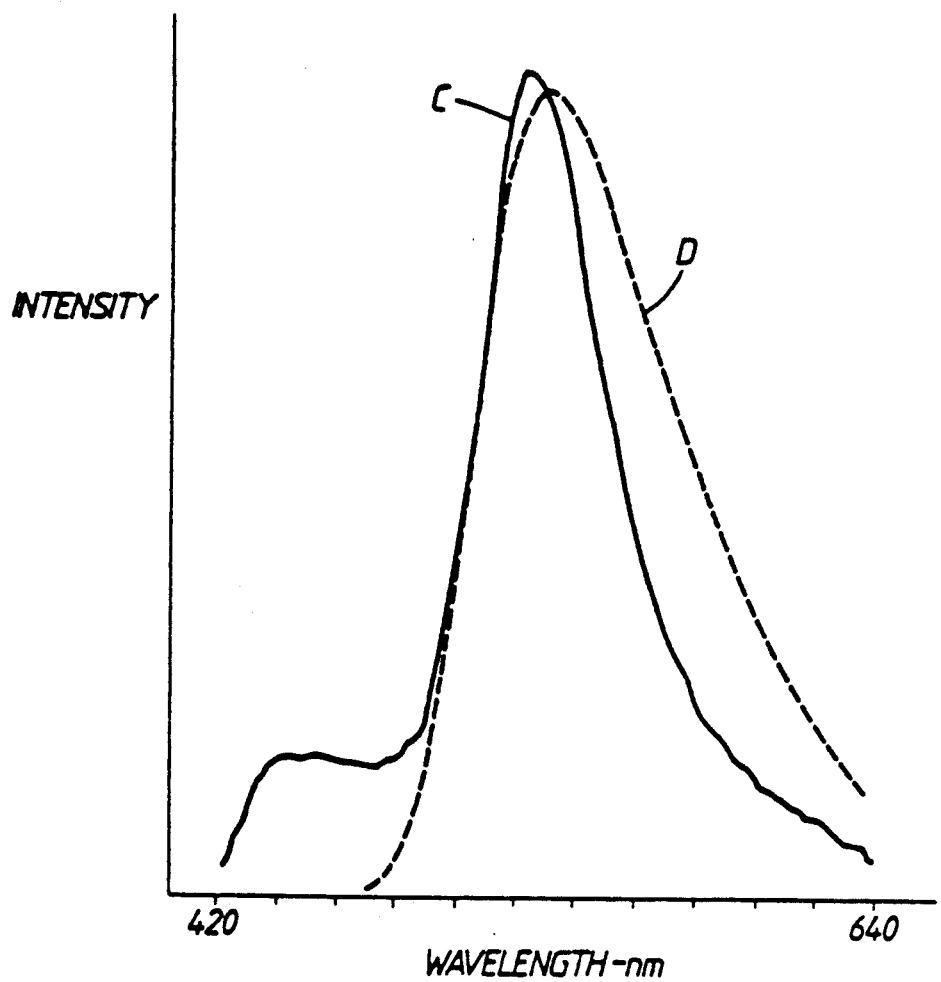
Figure 8:
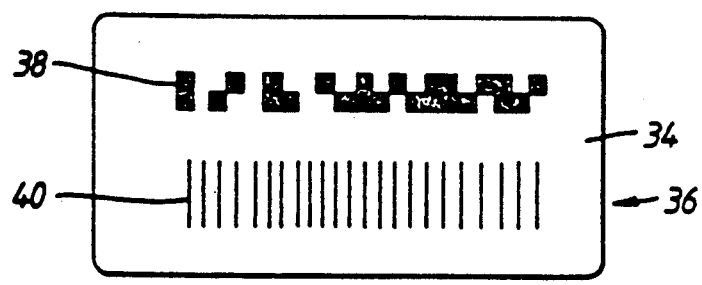

FIG. 6 a graph showing, as a relationship between intensity and wavelength, the emission spectra of the two fluorescent materials of FIG. 4;

FIG. 7 is a graph showing, as a relationship between intensity and wavelength, the emission spectra of two other flourescent materials for use in the present invention; and FIG. 8 is a plan view of the surface of a credit card made in accordance with a preferred embodiment of the invention.

Figure 1:
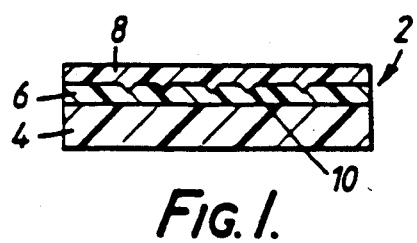
FIG. 1 show a cross-section through an article which is marked in accordance with a first embodiment of the present invention.

Referring to FIG. 1, an article 2 marked in accordance with the invention includes a base layer 4 over which are successively disposed a first fluorescent layer 6 and a second fluorescent layer 8. The base layer 4 consists of a core material of plastics material such as white PVC which contains titanium dioxide. The first fluorescent layer 6 is of a plastics material incorporating a first fluorescent material and is thermally bonded to the top of the base layer 4. The second fluorescent layer 8 is of a plastics material incorporating a second fluorescent material and is thermally bonded to the top of the first fluorescent layer 6. The top surface of the first fluorescent layer 6 is engraved with a plurality of grooves 10 which are preferably in a desired pattern. The second fluorescent layer 8 fills those grooves 10 and this intimate non-planar thermal bonding of the two fluroescent layers 6 and 8 renders delamination of the second fluorescent layer 8 from the first fluorescent layer 6 very difficult. The top surface of the base layer 4 may also be printed or engraved with desired information or a particular pattern which is visible through the two fluorescent layers 6 and 8 under normal daylight conditions. When the top surface of the base layer 4 is engraved with the desired information, the top surface is initially pre-printed with a black ink and then portions of the blackened surface are removed by engraving to produce the desired surface pattern. When the first fluorescent layer 6 is heat laminated over the base layer 4 the first fluorescent layer 6 fills in the engraved surface and renders delamination very difficult.

The plastics material in which the respective fluorescent materials may be incorporated may be polyethylene, polypropylene, polyvinyl chloride, polyamides, poly (ethylenetetraphthalate), cellulose nitrate. poly (methyl methacrylate)polycarbonates, acrylonitrile-butadiene-styrene coploymers, polystyrene, K-resins, poly (allylcarbonates), cellulose acetate, cellulose acetate butyrate and other such heat sealable materials. A particularly preferred plastics material is clear PVC.

It should be understood that the plastics material of the various layers of the article is formulated so as not to contain any UV, IR or any other visible colouring agent which would tend to reduce the excitation or emission-effects of the fluorescent layers. For this reason, the plastics layers are advantageously white or clear PVC.

The fluorescent materials are incorporated in the plastics material in a uniform manner (e.g. dissolved in bulk) and can be differentiated from other printing or coating procedures. In particular, the fluorescent effect is also visible at the edges of the plastics layers.

In accordance with the invention, the first fluorescent material and the second fluorescent material are selected so that they have different excitation spectra so that they are excited at different wavelengths of ultraviolet radiation and also have different emission spectra whereby when they are exited they emit different colours in the visible or infra red region of the spectrum.

The fluorescent materials have very large stokes shifts and appear clear under normal daylight conditions and are excited to produce fluorescence in the visible or infra red spectrum by ultraviolet radiation. The fluorescent materials may be any suitable organic or inorganic phosphors. Among the large number of such compounds, the following are named to illustrate and not to limit the group of suitable substances:- paraminobenzoic acid, 2-naphthalene-6-sulphonic acid, anthracene, zinc sulphide, zinc cadmium sulphide, methoxy, nitro, methyl and halogen-substituted benzthiazoles, benzazoles and related pyridyl benzimidazoles, coumarins, rhodamine dyes, azines of 2-hydroxy-1-naphthaldehyde, europium and samarium doped yttrium vanadate, tetraphenyl butadiene and fluorene sulphonic acid, sodium salicylate, barium platinocyanide, tungstates, arsenates, beta-naphthol, complexes (especially chelates) of rare earth metals having an atomic number greater than 57, diphenyl-imidazolone, aromatic amines, carboxylic acids, sulphonic acids, amine sulphonic acids, and phenols.

Figure 5:
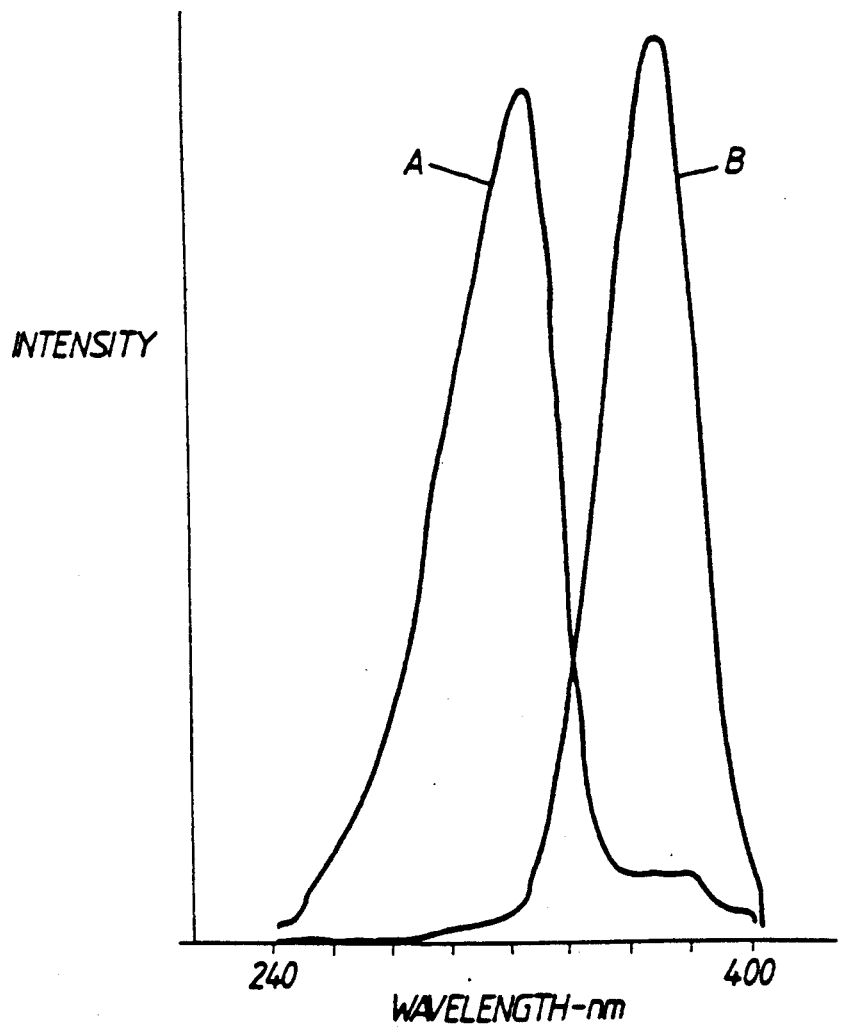
FIG. 5 is a graph showing, as a relationship between intensity and wavelength, the exitation spectra of two fluorescent materials for use in the present invention.

The spectra of two particularly preferred fluorescent materials are shown in FIGS. 5 and 6. FIG. 5 shows the excitation spectra of the first and second preferred fluorescent materials which can be employed to mark the article of FIG. 1. FIG. 6 shows the emission spectra of the first and second fluorescent materials. The spectra are represented by the relationship between intensity and wavelength. It is to be understood that in FIGS. 5 and 6 (and also FIG. 7 which is discussed below}the intensities shown are normalised intensities and do not show absolute values. Consequently the actual height of the peaks is of no consequence. Rather, it is the shape of the spectra which is of importance. Curve A is the excitation sprectrum, of the second fluoresent material which is in the second fluorescent layer 8. The excitation spectrum of Curve A has a peak of around 325 nm and this means that the second fluorescent material is excited to emit the maximum amount of fluorescent radiation by incident ultraviolet radiation having a wavelength of 325 nm. The second fluorescent material is also excited to a lesser extent by ultraviolet radiation having a wavelength on either side of this value as is represented by Curve A. In FIG. 6 Curve Al is the emission spectrum of the second fluorescent material and it may be seen that the second fluorescent material predominantly emits red fluorescence at a wavelength of around 620 nm. Curve B of FIG. 5 is the excitation spectrum of the first fluorescent material which is in the first fluorescent layer 6 and has a peak at around 370 nm. Curve $B^1$ of FIG. 6 shows that the first fluorescent material predominantly emits green fluorescence at around 530 nm.

When the top surface of the marked article is viewed in normal daylight, which contains insufficient ultraviolet radiation to excite the fluorescent materials, the two fluorescent material layers 6 and 8 are clear and the top surface of the base layer 4 is visible through the clear layers 6 and 8. When viewed in ultraviolet radiation at a wavelength of, for example, 366 nm, which radiation may be produced by an appropriate UV lamp, the ultraviolet radiation is transmitted with little alternation through the second fluorescent layer 8 since the intensity of Curve A at that wavelength is low and so the second fluorescent material is not excited at that wavelength. However, the first fluorescent material is excited at that wavelength and emits green fluorescence which is transmitted through the first fluorescent layer 6. Thus at a wavelength of 366 nm the marked article emits predominantly green fluorescence. When viewed with ultraviolet radiation having a wavelength of, for example, 254 nm, the second fluoresecent layer 8 is excited thereby to emit predominantly red fluorescence and the first fluorescent layer 6 is not excited to a significant extent by radiation which had been transmitted through the second fluorescent layer 8. Thus at a wavelength of 254 nm the marked article 2 emits predominantly red florescence.

It will be seen therefore that the marked article 2 can emit different characteristic colours of fluorescence when viewed in ultraviolet light having different wavelengths. The fluorescent materials employed can be varied so as to give different fluorescent colours at different excitation wavelengths of ultraviolet radiation. This affords a valuable and difficult to forge method of marking an article. To verify the authenticity of the article, a user views the article successively in ultraviolet radiation of the two specific different wavelengths which are known to produce particular colours and checks, in comparison with a reference sample, to see whether or not the fluorescent colours are correct. Any given article to be marked would be associated with a particular pair of fluorescent colours characteristic of that article. It would be very difficult for a potential forger to provide materials which reproduce the characteristic excitation and emission characteristics (visible and invisible) exactly and to incorporate these materials in a plastics matrix of the correct formulation. Furthermore, the fluorescent materials can be chosen so that they are excited by particular wavelengths of ultraviolet radiation. Thus a potential forger, in addition to providing fluorescent materials which fluoresce at the correct colour, would also have to ensure that those materials are excited at the correct wavelengths of ultraviolet radiation. Any verification of the article would involve successive ultraviolet radiation of the marked article at the respective particular excitation wavelengths of the two fluorescent materials and in order to produce a counterfeit article a forger would have to discover fluorescent material which fluoresed with the correct colours at the appropriate wavelengths used for verification.

As may also be seen from FIG. 5, at the cross-over point of Curves A and B, at around 340 nm, ultraviolet radiation at that wavelength would produce fluorescence from both the first and second fluorescent layers 6 and 8. The resultant composite emission produced would be a particular mixture of green and red. This feature may also be used to verify the authenticity of the article by illumination of the marked article at a wavelength in the region of the cross-over point thereby to produce a further characteristic colour.

Figure 2:
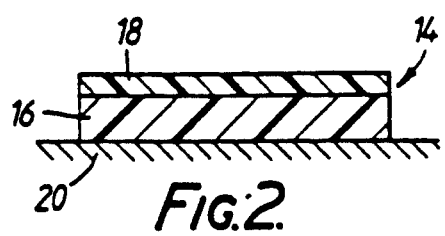
FIG. 2 shows a cross-section through an article which is marked in accordance with a second embodiment of the present invention.

FIG. 2 shows an alternative embodiment of a marked article in accordance with the invention. In this embodiment, the marked article 14 consists of a base layer 16 which contains the first fluorescent material and a further layer 18 which contains the second fluorescent material. The base layer 16 and the further layer 18 are formed from plastics material, typically PVC, and are thermally bonded together. The top surface of the base layer 16 may be printed with desired information as described above in connection with the embodiment of FIG. 1.

As in the embodiment of FIG. 1, the two layers 16 and 18 are adapted to fluoresce at different particular excitation wavelengths of ultraviolet radiation and to produce different characteristic fluorescent colours. This embodiment is less secure than that of FIG. 1 since it only consists of two layers rather than three which renders delamination of the layers by a forger potentially less difficult.

Figure 3:
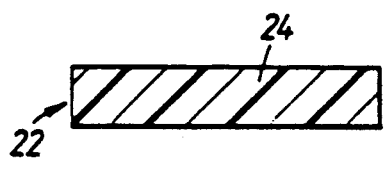
FIG. 3 shows a cross-section through an article which is marked in accordance with a third embodiment of the present invention.

FIG. 3 shows a further alternative embodiment of a marked article in accordance with the invention. In this embodiment the marked article 22 consists of a single layer 24 of plastics material, such as PVC, in which is incorporated a homogeneous mixture of the first and second fluorescent material. Again, the two fluorescent materials are adapted to fluoresce at different particular exitation wavelengths of ultraviolet radiation and to produce different characteristic fluorescent colours. The top or bottom surface of the single layer 22 may be printed or engraved with appropriate information if desired.

FIG. 4 shows a still further alternative embodiment of a marked article in accordance with the invention. In this embodiment the marked article 26 consists of a base layer 28 of a plastics material such as PVC which incorporates a first fluorescent material such as that described above. The top surface of the base layer 28 has engraved thereon a plurality of grooves 30 which form a desired characteristic pattern and which are filled with a plastics material 32 such as PVC incorporating a second fluorescent material such as that described above. The plastics material 32 is thermally bonded within the grooves 30 of the base layer 28. During manufacture of the marked article the plastics material 32 may be deposited over the engraved surface of the base layer 28 and then those portions of the plastics material 32 not lying in the grooves 30 are removed, e.g. mechanically. Alternatively, the plastics material 32 may just fill the grooves 30. The present invention has particular application in the production of security or identification articles or documents, in particular, credit cards, passports, identity cards, banknotes, etc. For such applications the marked articles which are shown in FIGS. 1 to 4 either constitute the security articles or documents themselves or are securely applied to a security article or document. The marked article may be provided on its upper surface with a code number or any other readable number or identification character(s).

For example, as is shown in FIG. 8, when the marked article is a credit card, the upper surface 34 of the credit card 36 in addition to having the two fluorescent layers, is provided with a "checkerboard" identification pattern 38 and a timing (bar) code 40, which constitute binary information which are displayed on the credit card 36. In a particularly preferred arrangement of the credit card 36, the code numbers are printed or coated with special inks which absorb a particular wavelength emission of excitation. For example, by using a UV absorbing (but visibly transparent) ink on the first fluorescent layer (e.g. layer 6 in FIG. 1), excitation of the article by irradiating with the particular excitation wavelength of UV light will produce fluorescence from the top layer (e.g. layer 8 in FIG. 1) as well as those areas of the bottom layer which have not been printed with the UV absorbing ink. The areas which have been printed with the UV absorbing ink appear black. Thus in this way the code printed with the UV absorbing ink can be detected only when the article is irradiated with UV radiation.

As is shown in FIG. 2, the marked article 14 may be welded or bonded to, or incorporated in, a product 20, e.g. a video cassette, by any suitable manner e.g. by an adhesive or by heat bonding, radio-frequency welding or laser welding.

As an alternative to using the fluorescent materials whose properties are illustrated in FIGS. 5 and 6, any pair of fluorescent materials may be used having different emission and excitation spectra. The difference in the spectra need not be large. For example, FIG. 7 shows the emission spectra of two other fluorescent materials which could be employed in the present invention. Curve C is the emission spectrum of a first fluorescent material when excited by ultraviolet radiation of wavelength 254 nm and Curve D is the emission spectrum of a second fluorescent material when excited by ultraviolet radiation of wavelength 366 nm. It may be seen that Curve C has a peak at around 525 nm and appears green whereas Curve D has a peak around 530 nm and appears green/yellow. The two fluorescent colours can be distinguished by an observer.

Furthermore, it is also possible to employ fluorescent materials whose spectra can be distinguished by suitable radiation sensing devices. For example, a verification device could be arranged to detect the difference between the two colours represented by Curves C and D and thereby give an indication of the authenticity of the marked article. Alternatively, a verification device could be arranged to detect the ratios of the peaks in a particular spectrum, e.g. the peaks in Curves $A^1$ and $B^1$ at the respective particular excitation wavelengths and thereby give an indication of the authenticity of the fluorescent materials used and thus of the marked article. Such verification devices can be arranged to detect differences in wavelength and light intensity and can be employed to detect colour and fluorescent light intensity differences which could not easily be detected by the naked eye.

In further alternative arrangements the base layer is not made of a plastics material but consists of paper, glass or cloth which incorporates or is coated with a fluorescent material. For example, the fluorescent material may be a conventional "blue whitener" when the base is of paper or cloth.

Furthermore, the present invention is not limited to the use of two different fluorescent materials. Any convenient number of fluorescent materials may be used, provided that the luminescence emission from the marked article has different spectral characteristics when illuminated with different light sources.

I claim:

1. An article for identification which can be authenticated by sequential irradiation by at least two different wavelengths of ultraviolet radiation comprising a substrate having authentication markings which are provided by at least two fluorescent materials which are excited to fluoresce by said different wavelengths of ultraviolet radiation, and when excited fluoresce with different colors in the visible region of the spectrum, each of said fluorescent materials being incorporated homogeneously in a body of plastics material, the substrate also carrying visual identification data.

2. An article according to claim 1 wherein each fluorescent material is incorporated uniformly in a respective body of plastics material which forms a respective fluorescent layer and the fluorescent layers are superposed over each other.

3. An aritcle according to claim 2 wherein the fluorescent layers are heat bonded together.

4. An article according to claim 3 wherein the heat bonded surface of one of the fluorescent layers has engraved grooves therein into which extends that fluorescent layer which is heat bonded thereto.

5. An article according to claim 3 wherein the substrate comprises a base layer and the surface of the base layer which is covered by the superposed fluorescent layers is provided with said visual identification data which can be seen through the superposed fluroescent layers.

6. An article according to claim 5 wherein the visual identification data is provided by a pattern of a UV absorbing but visibly transparent material.

7. An article according to claim 5 wherein the base layer is a layer of plastics material and the base layer and the superposed fluorescent layers are heat bonded together.

8. An article according to claim 3 wherein there are at least two of the fluorescent layers and between two adjacent fluorescent layers is provided said visual identification data.

9. An article according to claim 8 wherein the visual identification data is provided by a pattern of a UV absorbing but visibly transparent material.

10. An article according to claim 2 wherein one of the fluorescent layers comprises the substrate.

11. An article according to claim 10 wherein a surface of the substrate fluorescent layer, over which surface another fluorescent layer is superposed, is provided with said visual identification data.

12. An article according to claim 11 wherein the visual identification data is provided by a pattern of a UV absorbing but visibly transparent material.

13. An article according to claim 1 wherein the at least two fluorescent materials are in admixture and are incorporated uniformly in a common body of plastics material.

14. An article according to claim 13 wherein the body constitutes the substrate.

15. An article according to claim 1 wherein one of the fluorescent materials is incorporated uniformly in a layer of plastics material, an exposed surface of the layer of plastics material is engraved with grooves representing said visual identification data, and a second one of the fluorescent materials is incorporated uniformly in a body of plastics material which fills the grooves.

16. A method of marking an article for identification, the method comprising providing the article with at least two fluorescent materials which are excited to fluoresce by at least two different wavelengths of ultraviolet radiation, and when excited, fluoresce with different colors in the visible region of the spectrum, each fluorescent material being homogeneously incorporated in a body of plastics material, and also providing the article with visual identification data.

17. A method according to claim 16 wherein each fluorescent material is incorporated uniformly in a respective body of plastics material which forms a respective fluorescent layer and the fluorescent layers are superposed over each other.

18. A method according to claim 17 wherein the fluorescent layers are heat bonded together.

19. A method according to claim 18 wherein a surface of one of the fluorescent layers to be heat bonded is engraved with grooves whereby when another of the fluorescent layers is heat bonded thereto that other fluorescent layer extends into the grooves.

20. A method according to claim 18 wherein the substrate comprises a base layer and the surface of the base layer which is covered by the superposed fluorescent layers is provided with said visual identification data which can be seen through the superposed layers.

21. A method according to claim 20 wherein the visual identification data is provided by a pattern of a UV absorbing but visibly transparent material.

22. A method according to claim 20 wherein the base layer is a layer of plastics material and the base layer and the superposed fluorescent layers are heat bonded together.

23. A method according to claim 17, wherein there are at least two of the fluorescent layers and between two adjacent fluorescent layers is provided said visual identification data.

24. A method according to claim 23 wherein the visual identification data is provided by a pattern of a UV absorbing but visibly transparent material.

25. A method according to claim 17 wherein one of the fluorescent layers comprises the substrate.

26. A method according to claim 25 wherein a surface of the substrate fluorescent layer, over which surface another fluorescent layer is superposed, is provided with visual identification data.

27. A method according to claim 26 wherein the visual identification data is provided by a pattern of a UV absorbing but visibly transparent material.

28. A method according to claim 16 wherein the at least two fluorescent materials are mixed together and are incorporated uniformly in a common body of plastics material.

29. A method according to claim 28 wherein the body constitutes the substrate.

30. A method according to claim 16 wherein one of the fluorescent materials is incorporated uniformly in a layer of plastics material, an exposed surface of the layer of plastics material is engraved with grooves representing visual identification data, and a second one of the fluorescent materials is incorporated uniformly in a body of plastics material which fills the grooves.

* * * * *